United States Patent
Sekiguchi (10) Patent No.: US 8,155,856 B2
(45) Date of Patent: Apr. 10, 2012

(54) VEHICLE RUNNING CONTROL SYSTEM

(75) Inventor: Hiroyuki Sekiguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 439 days.

(21) Appl. No.: 12/382,181

(22) Filed: Mar. 10, 2009

(65) Prior Publication Data

US 2009/0234553 A1 Sep. 17, 2009

(30) Foreign Application Priority Data

Mar. 13, 2008 (JP) .................................. 2008-064611

(51) Int. Cl.
*B60T 7/12* (2006.01)
(52) U.S. Cl. .......... 701/96; 340/435; 340/439; 340/436; 701/93; 701/41; 701/300
(58) Field of Classification Search .................... 701/96, 701/93, 41, 300; 359/436; 340/439, 435, 340/576

See application file for complete search history.

(56) References Cited

U.S. PATENT DOCUMENTS

| | | | |
|---|---|---|---|
| 7,663,475 B2 * | 2/2010 | Kudo | 340/435 |
| 2003/0195704 A1 | 10/2003 | Sekiguchi | |
| 2005/0128063 A1 * | 6/2005 | Isaji et al. | 340/439 |
| 2006/0103927 A1 * | 5/2006 | Samukawa et al. | 359/436 |
| 2007/0069873 A1 * | 3/2007 | Kudo | 340/435 |
| 2008/0243351 A1 * | 10/2008 | Isogai et al. | 701/96 |

FOREIGN PATENT DOCUMENTS

JP 2003-308598 10/2003

* cited by examiner

*Primary Examiner* — Behrang Badii
(74) *Attorney, Agent, or Firm* — Smith, Gambrell & Russell, LLP (57) ABSTRACT

In a vehicle running control system, when an estimated collision time taken until a subject vehicle collides with a target object is shorter than a set threshold value, the target object is regarded as a preceding vehicle, and the subject vehicle is caused to follow the target object. Even in a case in which the estimated collision time is longer than or equal to the threshold value, when the target object is present on a subject-vehicle traveling lane or when the subject-vehicle traveling lane is not recognized, if an overlapping ratio between the subject vehicle and the target object is more than or equal to an overlapping-ratio determining threshold value, the target object is regarded as a preceding vehicle, and the subject vehicle is caused to follow the target object.

13 Claims, 7 Drawing Sheets

VEHICLE RUNNING CONTROL SYSTEM

CROSS REFERENCE TO RELATED APPLICATIONS

The disclosure of Japanese Patent Application No. 2008-064611 filed on Mar. 13, 2008 including the specification, drawings and abstract is incorporated herein by reference in its entirety.

BACKGROUND OF THE INVENTION

1. Field of the Invention

The present invention relates to a vehicle running control system in which, even in a case in which a target object is not recognized as a preceding vehicle, when a fixed condition is satisfied, the target object is regarded as a preceding vehicle and a subject vehicle is caused to follow the target object.

2. Description of the Related Art

In recent years, various proposals have been made for vehicle drive assist systems in which an outside environment in front of a subject vehicle is recognized by a front-environment recognition device such as a millimeter-wave radar, an infrared laser radar, a stereo camera, or a monocular camera, and in which running of the subject vehicle is controlled on the basis of the recognized outside environment.

One of these vehicle drive assist systems is an inter-vehicle distance control (ACC; Adaptive Cruse Control) system. The ACC system performs constant-speed running control so that a subject vehicle travels at a vehicle speed set by the driver (set vehicle speed) and follow-up running control so that the subject vehicle follows a preceding vehicle, in accordance with the result of recognition of the preceding vehicle.

The ACC system determines, according to information from a front-environment recognition device, whether or not the preceding vehicle is traveling in a traveling region of a traveling path of the subject vehicle. When the preceding vehicle is detected, the ACC system registers the preceding vehicle, and performs follow-up running control so that the subject vehicle follows the registered preceding vehicle at a constant distance and a constant speed relative to the preceding vehicle, by using throttle control or brake control. In contrast, when the preceding vehicle is not detected, the ACC system performs constant-speed running control so that the subject vehicle travels at the speed set by the driver. For example, the ACC system is disclosed in Japanese Unexamined Patent Application Publication No. 2003-308598 (Patent Document 1).

In a case in which a preceding vehicle to follow is registered, if all three-dimensional objects present in the traveling region, which is set in front of the subject vehicle and centered on the traveling path of the subject vehicle, are selected as candidates for target objects, for example, when the subject vehicle enters a curve, stationary three-dimensional objects, such as guardrails standing on the sides of the curve and vehicles stopped outside the curve, are also selected as candidates. As a result, when the subject vehicle comes close to the stationary three-dimensional objects, an unnecessary braking operation is performed.

On the other hand, for example, when the preceding vehicle serving as a target object stops at a red light, it is also regarded as a stationary three-dimensional object and is removed from candidates for target objects. In this case, the subject vehicle following the preceding vehicle is not controlled by the ACC system even when the subject vehicle comes close to the stopped preceding vehicle. Hence, unless the subject vehicle is decelerated by a braking operation of the driver or by an automatic brake control device, the subject vehicle cannot be stopped at an appropriate inter-vehicle distance from the preceding vehicle.

In such a case in which the stopped preceding vehicle is excluded from candidates for target objects in the ACC system although it is recognized by the driver or in which stationary three-dimensional objects, such as guardrails in front of the subject vehicle and vehicles stopped outside the road, are registered as target objects although they are not recognized as the preceding vehicle by the driver, control is performed against the driver's intention. This gives the driver a feeling of discomfort.

SUMMARY OF THE INVENTION

In light of the above circumstances, it is an object of the present invention to provide a vehicle running control system which can achieve a good running state that meets the driver's intention, by regarding a target object as a preceding vehicle when the target object satisfies a fixed condition and causing a subject vehicle to follow the target object.

In order to achieve the above object, a vehicle running control system according to an aspect of the present invention includes front-environment recognition means for recognizing a running environment in front of a subject vehicle; target-object extracting means for extracting target objects in front of the subject vehicle on the basis of the running environment recognized by the front-environment recognition means; target-object registration means for registering a target object closest to the subject vehicle, of the target objects extracted by the target-object extracting means; follow-up running control means for performing throttle control or brake control so that the subject vehicle follows the registered target object; and running control determining means for determining whether or not to cause the follow-up running control means to perform control so that the subject vehicle follows the registered target object. The running control determining means compares an estimated time taken until the subject vehicle collides with the registered target object with a set threshold value, and causes the follow-up running control means to perform control so that the subject vehicle follows the target object when the estimated time is shorter than the threshold value.

According to the aspect of the present invention, even if a target object is not recognized as a preceding vehicle, when a fixed condition is satisfied, the target object is regarded as the preceding vehicle and the subject vehicle is caused to follow the target object. This can obtain a good running state that meets the driver's intention.

DESCRIPTION OF THE PREFERRED EMBODIMENTS

Figure 1:
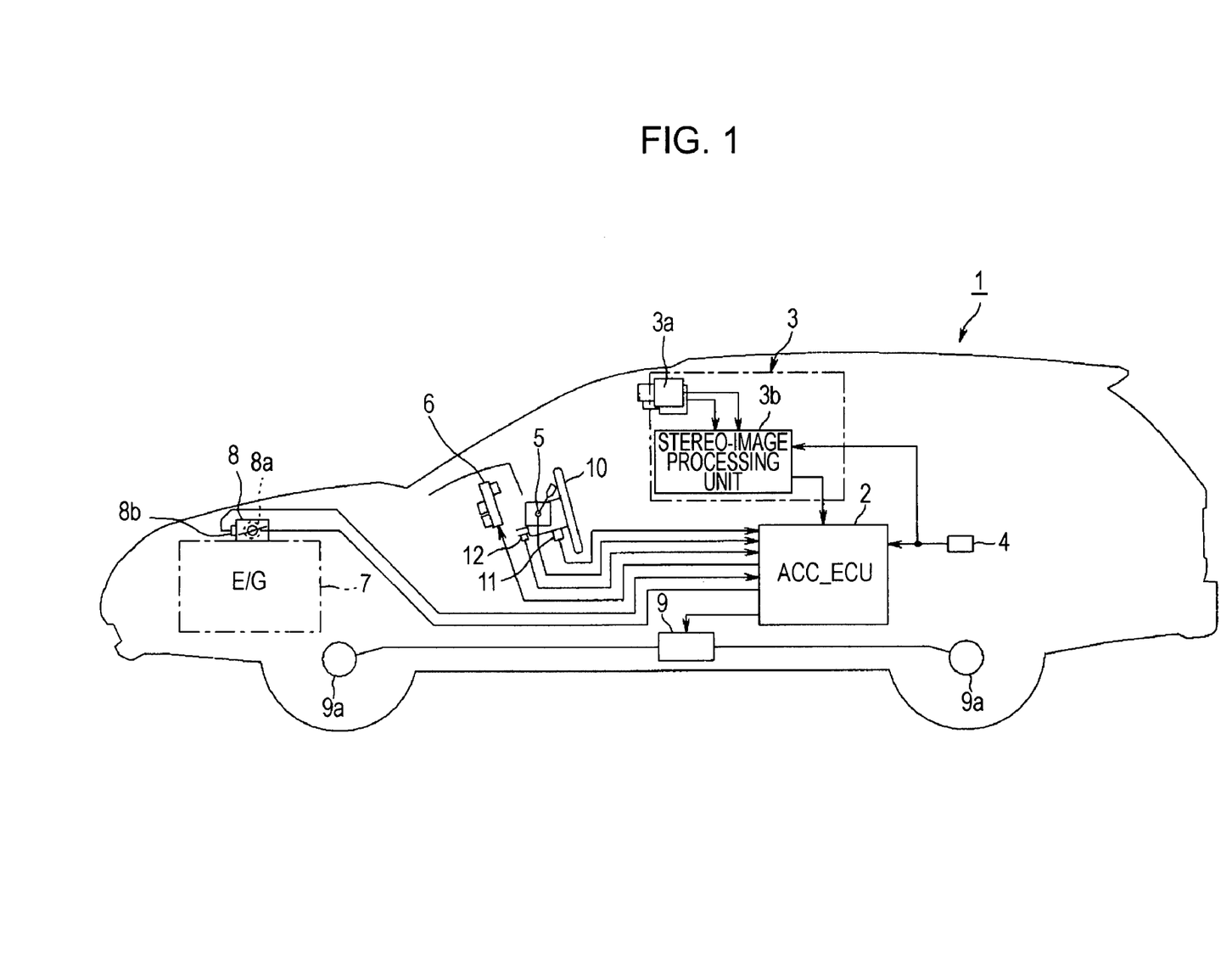
FIG. 1 is a schematic structural view of a vehicle in which a running control system is mounted.

An embodiment of the present invention will be described below with reference to the drawings. FIG. 1 is a schematic structural view of a vehicle in which an ACC system is mounted.

Referring to FIG. 1, a subject vehicle, such as a car, 1 includes an electronic control device (ACC_ECU) 2 that controls the ACC system. The ACC_ECU 2 is mainly formed by a microcomputer including a CPU, a ROM, a RAM, and a nonvolatile memory, such as an EEPROM, which are known. The CPU processes detection signals from sensors and switches according to control programs stored in the ROM, and performs running control, such as throttle control and brake control, on the basis of various data stored in the RAM and various learning data stored in the nonvolatile memory.

A front-environment recognition device 3, a vehicle-speed sensor 4, a cruise switch 5, a turn signal switch 11, a steering-angle sensor 12, a yaw-rate sensor 13, and a throttle-opening sensor 8b are connected to an input side of the ACC_ECU 2. The front-environment recognition device 3 serves as a front-environment recognition means that takes an image of an environment in front of the subject vehicle 1 and that recognizes a running environment in front of the subject vehicle 1 on the basis of the image. The vehicle-speed sensor 4 detects a vehicle speed V (Km/h) of the subject vehicle 1 (subject vehicle speed). The cruise switch 5 turns the ACC system on and off. The turn signal switch 11 is provided at a steering column. The steering-angle sensor 12 is connected to a steering shaft that is connected to a steering wheel 10, and detects a steering angle θst serving as a rotation angle of the steering wheel 10. The yaw-rate sensor 13 detects a yaw rate γ acting on the vehicle body. The throttle-opening sensor 8b detects the opening of a throttle valve.

A combination meter 6 in which a speed meter, a rotation meter, etc. are arranged in a predetermined manner is connected to an output side of the ACC_ECU 2. Moreover, a throttle actuator 8a and a brake booster 9 are connected to the output side of the ACC_ECU 2. The throttle actuator 8a is provided in an electronic control throttle device 8 mounted in an induction system of an engine 7, and opens and closes the throttle valve. The brake booster 9 forcibly supplies hydraulic brake pressure to brake wheel cylinders 9a attached to the four wheels. When hydraulic brake pressure is supplied from the brake booster 9 to the brake wheel cylinders 9a, the wheels are braked, and the running subject vehicle 1 is forced to decelerate.

The front-environment recognition device 3 includes a stereo camera 3a and a stereo-image processing unit 3b. The stereo camera 3a includes a pair of right and left CCD cameras respectively using solid-state image pickup elements, such as charge coupled devices (CCDs), as stereo optical systems. The CCD cameras are spaced a fixed distance apart on the front of a ceiling in the vehicle interior. The CCD cameras take stereo images of a target object outside the subject vehicle 1 from different viewpoints, and input image data on the stereo images to the stereo-image processing unit 3b.

The stereo-image processing unit 3b obtains distance information from the difference between the corresponding positions in the stereo images of the environment in front of the subject vehicle 1 that are taken by the right and left CCD cameras of the stereo camera 3a, and generates a distance image on the basis of the distance information. According to data on the distance image, the stereo-image processing unit 3b recognizes the running environment in front of the subject vehicle 1, and determines whether or not an obstacle is present on the road in a traveling region in front of the subject vehicle 1. When the stereo-image processing unit 3b detects a vehicle that the subject vehicle 1 is to follow (hereinafter referred to as a "preceding vehicle"), which is traveling on a traveling path (subject-vehicle traveling path) in front of the subject vehicle 1, from obstacles detected on the road, it finds a relative distance and a relative speed between the subject vehicle 1 and the preceding vehicle. Then, the stereo-image processing unit 3b outputs information about the recognized running environment and various data on the relative distance and relative speed to the ACC_ECU 2.

The ACC_ECU 2 detects all three-dimensional objects present in the subject-vehicle traveling region on the basis of information about the running environment recognized by the stereo-image processing unit 3b, and detects a three-dimensional object as a target object, from the three-dimensional objects. In accordance with the type of the detected three-dimensional object, the ACC_ECU 2 carries out normal follow-up running control or throttle follow-up running control that causes the subject vehicle 1 to follow the target object only by throttle control without braking. When there is no three-dimensional object that is to be a target object, constant-speed running control is performed so that the subject vehicle 1 travels at the vehicle speed set by the driver (set vehicle speed).

Figure 2:
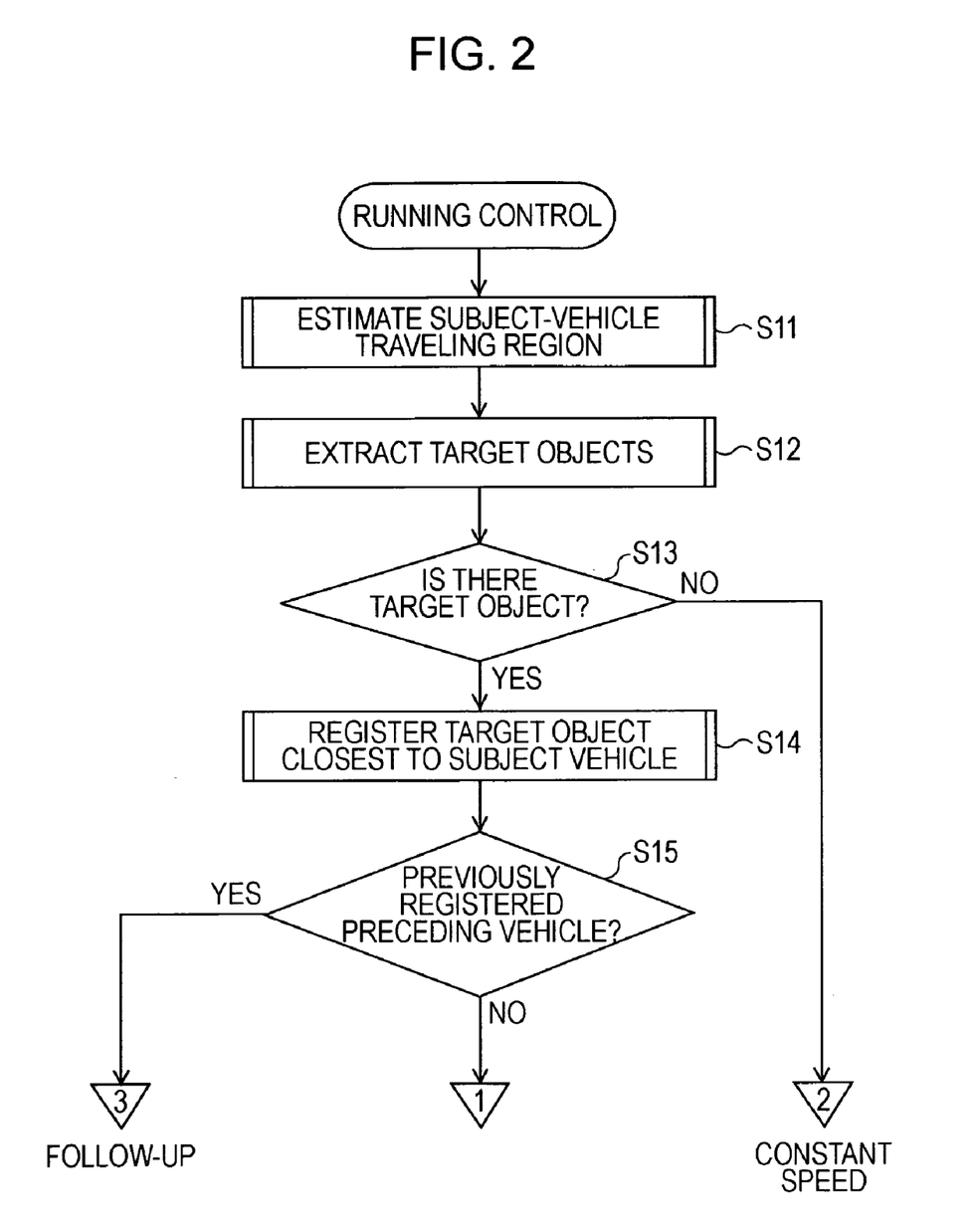
FIG. 2 is a first flowchart showing a running control routine.
Figure 3:
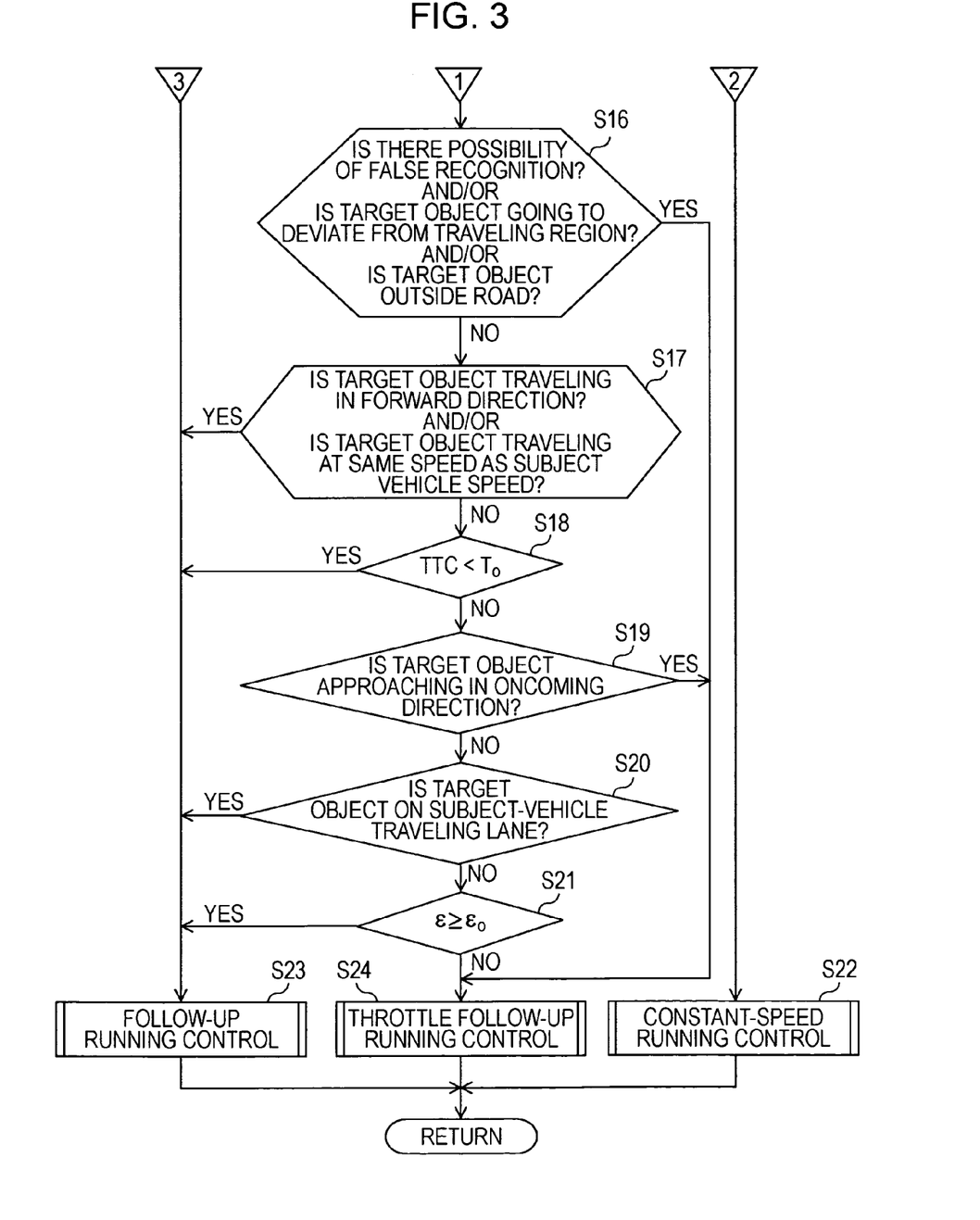
FIG. 3 is a second flowchart showing the running control routine.
Figure 4:
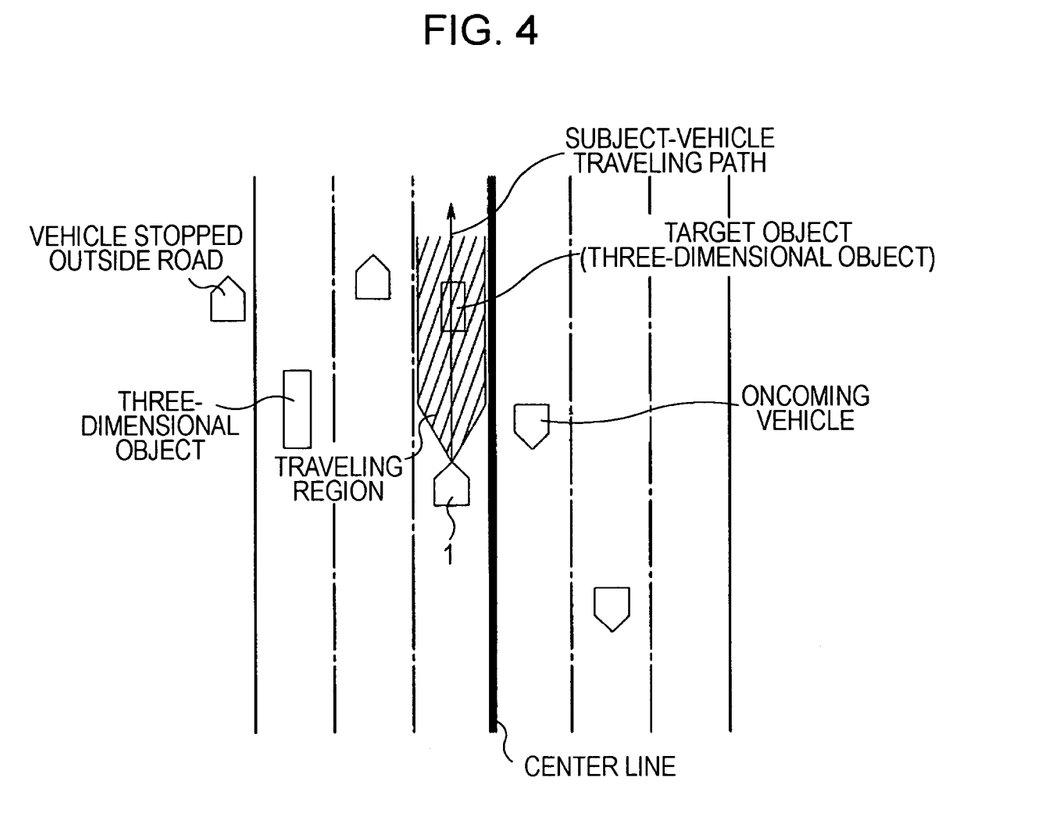
FIG. 4 explains a traveling region of a subject vehicle.

More specifically, the ACC_ECU 2 performs running control according to flowcharts shown in FIGS. 2 to 5. That is, when the driver turns on the cruise switch 5, a running control routine shown in FIGS. 2 and 3 is performed in every setting calculation period.

First, in Step S11, a subject-vehicle traveling-region estimating step is performed to estimate a forward traveling region of the subject vehicle 1. This subject-vehicle traveling-region estimating step is disclosed in the above-described Patent Document 1. For example, in order to estimate a subject-vehicle traveling region on the basis of a traveling locus of the subject vehicle 1, a turning radius of the subject vehicle 1 is calculated on the basis of the yaw rate γ detected by the yaw-rate sensor 13, the subject vehicle speed V detected by the vehicle-speed sensor 4, and the steering angle θst detected by the steering-angle sensor 12. A subject-vehicle traveling path is estimated from the average value of the calculated turning radius and a previous turning radius in a predetermined time (e.g., 0.3 sec). Then, a region having a predetermined width and centered on the subject-vehicle traveling path is estimated as a traveling region of the subject vehicle 1 (subject-vehicle traveling region) (see FIGS. 4 and 5).

In Step S12, all three-dimensional objects present in the subject-vehicle traveling region are detected on the basis of information about the running environment recognized by the stereo-image processing unit 3b, and three-dimensional objects that are to be target objects are extracted from the detected three-dimensional objects. Up to four target objects, namely, a moving three-dimensional object (moving object), a three-dimensional object approaching in the oncoming direction (oncoming object), a stopped three-dimensional object (stopped object), and a vehicle preceding a preceding vehicle (PP-vehicle), are extracted according to the types and in the increasing order of distance from the subject vehicle 1. The operation in this step corresponds to the three-dimensional-object detecting means and the target-object extracting means in the present invention.

In Step S13, it is determined whether or not there is a target object. When there is no target object, the routine jumps to Step S22, and constant-speed running control is performed so that the subject vehicle 1 travels at the set vehicle speed. Then, the routine is exited.

In contrast, when there are target objects, a target object closest to the subject vehicle 1 is specified and registered in Step S14. For example, in FIG. 4, a three-dimensional object traveling in front of the subject vehicle 1 is registered as a target object. The operation in this step corresponds to the target-object registration means in the present invention.

In Steps S15 to S21, it is determined whether or not the registered target object can be regarded as a preceding vehicle. The operations in Steps S15 to S21 correspond to the running-control determination means in the present invention.

When it is determined in the above-described Steps S15 to S21 that the registered target object can be regarded as a preceding vehicle, the subject vehicle 1 is caused to follow the target object. In contrast, when it is determined that the target object cannot be regarded as a preceding vehicle, throttle follow-up control is performed so that the subject vehicle 1 follows the target object under throttle control. In normal follow-up running control, a target inter-vehicle distance is set on the basis of the speed of the target object or the vehicle speed V of the subject vehicle 1 (subject vehicle speed), a target vehicle speed for maintaining the target inter-vehicle distance is set, and opening and closing of the throttle valve are controlled via the throttle actuator 8a so that the subject vehicle speed V equals the target vehicle speed. In this case, when the subject vehicle 1 comes too close to the target object and the inter-vehicle distance therebetween cannot be returned to the target inter-vehicle distance only by engine brake, deceleration is forcibly performed by also using automatic brake control so as to maintain the target inter-vehicle distance.

In throttle follow-up running control, running of the subject vehicle 1 is controlled only by throttle control without automatic brake control. Throttle control includes full closing of throttle for using the engine brake, throttle keeping for maintaining the opening of the throttle valve, and slow acceleration follow-up for following at an acceleration speed lower than the follow-up acceleration speed in normal follow-up running control.

First, in Step S15, it is determined whether or not the currently registered target object is the same as the target object regarded as the preceding vehicle and registered in the previous calculation. When it is determined that the currently registered target object is the same as the previously registered target object, the routine jumps to Step S23, follow-up running control is continued, and then, the routine is exited.

In contrast, when it is determined that the currently registered target object is different from the previously registered target object, it is determined in Step S16 whether or not the currently registered target object satisfies any of the following conditions:

(1) The target object may be recognized falsely.
(2) The target object is going to move out of the traveling region.
(3) The target object is present outside the road.

The above-described condition (1) shows a situation in which a target object is not specified clearly. In this situation, the subject vehicle 1 needs to follow the target object at a low acceleration speed so as not to come too close to the target object. The above-described conditions (2) and (3) show a situation in which braking should not be used because the driver can cause the subject vehicle 1 to avoid the target object by turning the steering wheel.

For example, the condition (1) corresponds to a case in which it is determined, as a result of pattern matching between information from the stereo-image processing unit 3b and a template image registered beforehand, that the degree of coincidence with a preceding vehicle is low and there is a high risk of recognizing the target object as the preceding vehicle because of the influence of smoke exhausted from the rear of the target object or rain. Since the driver tends to drive the subject vehicle 1 at a relatively long distance from such a target object that may be falsely recognized, if normal follow-up running control is performed, the driver may have a feeling of discomfort.

For example, the condition (2) corresponds to a case in which the target object changes its traveling lane. While follow-up running had been continued until the target object moved out of the traveling lane, throttle follow-up running control is performed when it is determined that the target object is going to move out of the traveling lane in this embodiment. Therefore, unnatural follow-up is not performed, and running control that meets the driver's intention can be achieved.

Figure 6:
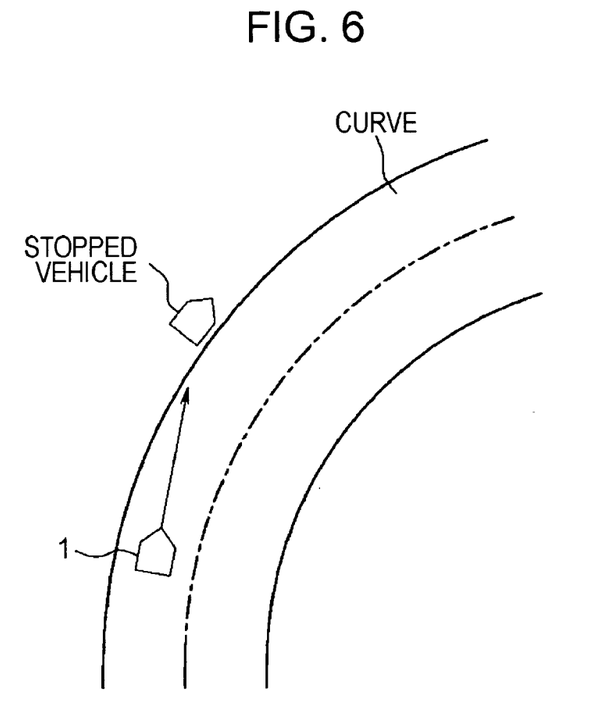
FIG. 6 explains a case in which a target object is a vehicle stopped outside a curve and in front of the subject vehicle.

For example, the condition (3) corresponds to a case in which there is a vehicle (stopped vehicle) that has stopped ahead of the subject vehicle 1 and outside the road when the subject vehicle 1 enters a curve, as shown in FIG. 6. While constant-speed running control had been performed when it was determined that the target object was outside the road, throttle follow-up running control is performed in this embodiment. Therefore, the subject vehicle 1 can pass the target object present outside the road while being decelerated. This allows running control that meets the intention of the driver.

When it is determined in Step S16 that the target object satisfies at least one of the conditions, the target object is not regarded as a preceding vehicle. Thus, the routine jumps to Step S24 so as to perform throttle follow-up running control, and is exited. In contrast, when the target object does not satisfy any of the conditions (1) to (3), it is further determined in Step S17 and subsequent steps whether or not the target object can be regarded as a preceding vehicle.

In Step S17, it is determined, on the basis of the relative distance and relative speed between the target object and the subject vehicle 1, whether or not the target object is moving in the same direction (forward direction) as that of the subject vehicle 1 and whether or not the speed of the target object is the same as the subject vehicle speed V. When at least one of the conditions that the target object is moving in the forward direction and that the target object is moving at the same speed as the subject vehicle speed V is satisfied, the target object is regarded as a preceding vehicle. Then, in Step S23, running control is performed so that the subject vehicle 1 follows the regarded preceding vehicle, and the routine is exited.

Therefore, when the target object registered as the preceding vehicle in the previous routine has moved out of the traveling lane and the currently registered target object is a vehicle (PP-vehicle) that is traveling ahead of the previously registered preceding vehicle before the previously registered preceding vehicle moves out, the routine proceeds from Step S17 to S23, the current target object is regarded as a preceding vehicle, and follow-up running control is performed. Even when the target object regarded as the preceding vehicle is moving in the forward direction at a speed lower than that of the subject vehicle 1, follow-up running control is also performed.

In contrast, when it is determined that the target object is not moving in the forward direction or is not traveling at the same speed as the subject vehicle speed V, or the determination cannot be reliably made, it is considered that the target object has stopped, is approaching in the oncoming direction, or is present at a position too remote to be specified. Therefore, it is further determined whether or not to regard the target object as a preceding vehicle in Step S18 and subsequent steps. The stopped target object is, for example, a vehicle that is waiting at a red light.

In Step S18, an estimated (allowed) time (also referred to as an estimated collision time or an allowed collision time) TTC (TTC=relative distance/relative speed) taken until the subject vehicle 1 collides with the target object is calculated on the basis of the relative distance and relative speed. Then, the estimated collision time TTC is compared with a set threshold value $T_o$. For example, the threshold value $T_o$ is set by correcting the subject vehicle speed V and a target inter-vehicle distance Ls, which is set on the basis of the subject vehicle speed V, by a correction value k set on the basis of the overlapping ratio $\epsilon$ (which will be described in detail below) between the subject vehicle 1 and the target object ($T_o$=(Ls/V)·k).

The correction value k is a variable value set within the range of 1.0 to 0. The correction value k is set at 1.0 when $\epsilon$=100% and at 0 when $\epsilon$=0%. The correction value k linearly or nonlinearly changes within the range of 1.0 to 0 in accordance with the overlapping ratio $\epsilon$. The threshold value $T_o$ set when k=1.0 is slightly larger than the initial threshold value (a threshold value for determining warning) T1 set when automatic brake control is performed, as will be described below.

When it is determined that TTC<$T_o$, normal follow-up running control is performed in Step S23. When it is determined that TTC≧$T_o$, there is no need to regard the target object as a preceding vehicle on the basis of the estimated collision time TTC. Therefore, it is further determined in Step S19 whether or not the target object can be regarded as a preceding vehicle under other conditions.

In normal follow-up running control performed in Step S23, when the subject vehicle 1 comes too close to the target object, deceleration is forcibly performed by automatic brake control. Therefore, even when the target object cannot actually be regarded as a preceding vehicle, it is regarded as the preceding vehicle, so that the subject vehicle 1 can be stopped at a safe distance from the target object.

Figure 7:
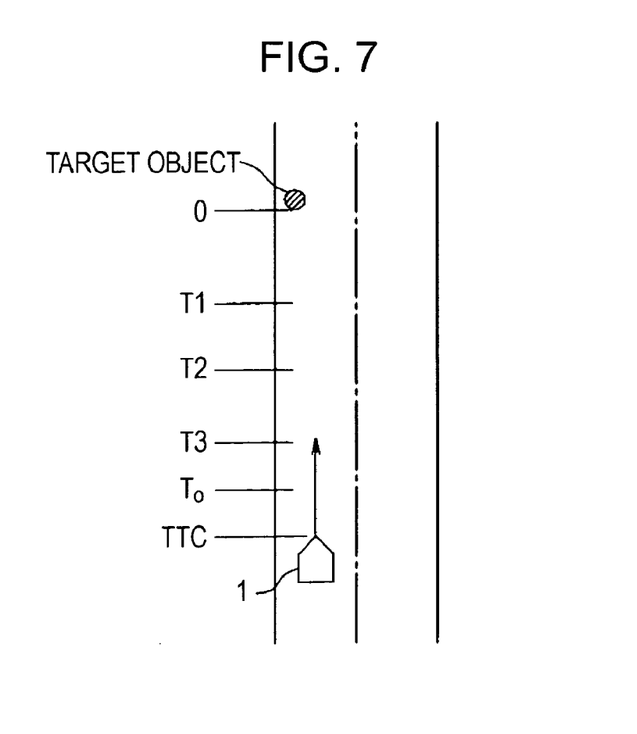
FIG. 7 explains the relationship between the estimated collision time and automatic brake control.

Automatic brake control will now be described briefly. In automatic brake control adopted in this embodiment, as shown in FIG. 7, the estimated collision time TTC is compared with three threshold values T1 to T3. When the estimated collision time TTC becomes shorter than or equal to a threshold value T1 for determining a warning which is the longest time (TTC≦T1), a weak braking force of about 0.1 G is applied, and the brake lights are turned on so as to warn the succeeding vehicle of sudden braking. When the estimated collision time TTC becomes shorter than or equal to a threshold value T2 for determining a brake (TTC≦T2), a braking force of about 0.3 G is applied to forcibly decelerate the subject vehicle 1. When the estimated collision time TTC becomes shorter than or equal to a threshold value T3 for determining a sudden brake (TTC≦T3), a sudden braking force of about 0.5 G is applied to stop the subject vehicle 1 before TTC reaches 0, that is, to stop the subject vehicle 1 short of the target object.

Therefore, for example, even when the target object is a vehicle or a pedestrian stopped at a red light or a stationary three-dimensional object, it is regarded as a preceding vehicle. In this case, the subject vehicle 1 approaches the target object from behind, and it is determined in Step S18 that the estimated collision time TTC is shorter than the set threshold value $T_o$ (TTC<$T_o$), follow-up running control is performed in Step S23. Hence, the subject vehicle 1 is decelerated to a predetermined speed, and is then safely stopped short of the target object.

Figure 5:
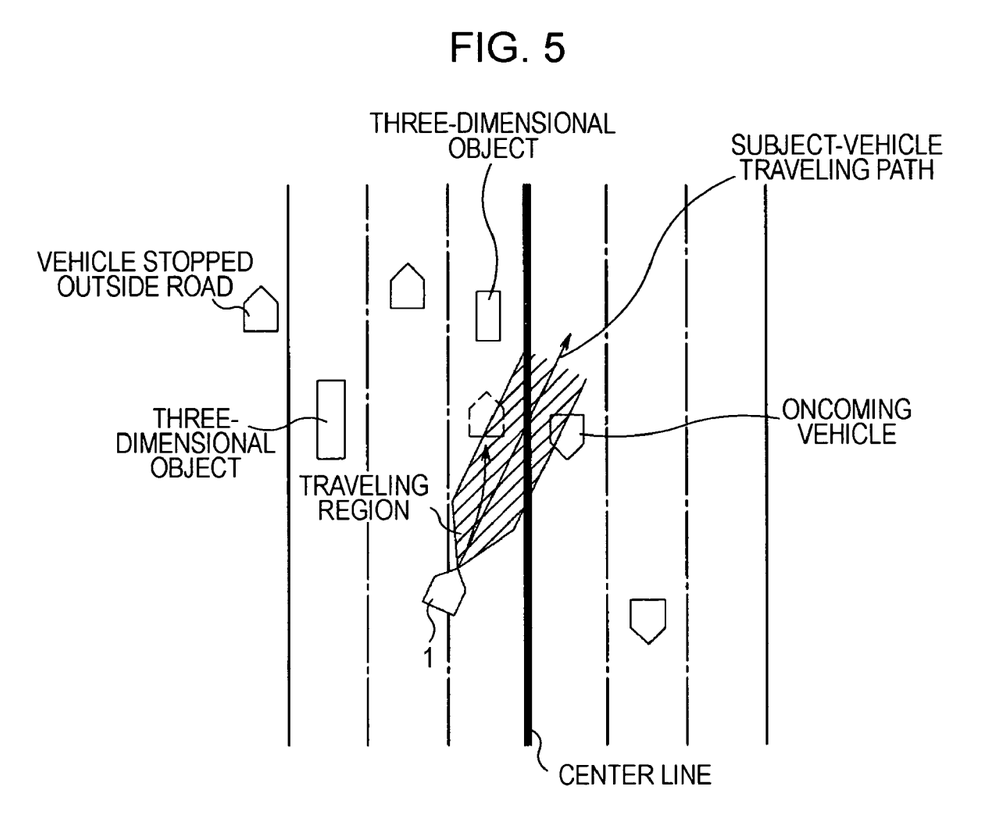
FIG. 5 explains a traveling region set when the subject vehicle changes a traveling lane.

When the routine proceeds from Step S18 to Step S19, it is determined, from the relative distance and relative speed between the target object and the subject vehicle 1, whether or not the target object is approaching in the oncoming direction. When it is determined that the target object is approaching in the oncoming direction, throttle follow-up running control is performed in Step S24 so that the subject vehicle 1 follows the target object, and the routine is exited. For example, when the subject vehicle 1 turns the body thereof toward the adjacent traveling lane so as to change the traveling lane, as shown in FIG. 5, since the stereo camera 3a points toward the oncoming lane, the oncoming vehicle is sometimes specified as a target object. If normal follow-up running control is performed in this situation, the above-described automatic brake control is carried out. In contrast, since throttle follow-up running control is performed in this embodiment, when the target object and the subject vehicle 1 come close to each other or pass each other, deceleration is performed only by engine brake, and unnecessary braking is not performed. This achieves running that meets the driver's intention.

When it is determined in Step S19 that the target object is not approaching in the oncoming direction, it cannot be specified whether the target object is stopped or is traveling. It is further determined in Steps S20 and S21 whether or not the target object can be regarded as a preceding vehicle.

In Step S20, it is determined whether or not the target object is present on a subject-vehicle traveling lane. The subject-vehicle traveling lane is set on the basis of white lines or guardrails recognized on both sides of the subject-vehicle traveling path according to information from the stereo-image processing unit 3b. When it is determined that the target object is present on the subject-vehicle traveling lane, normal follow-up running control is performed in Step S23, and the routine is exited. Therefore, at least in a case in which it is determined that the target object is present on the subject-vehicle traveling lane, when the subject vehicle 1 comes too close to the target object, automatic brake control is performed.

Figure 8:
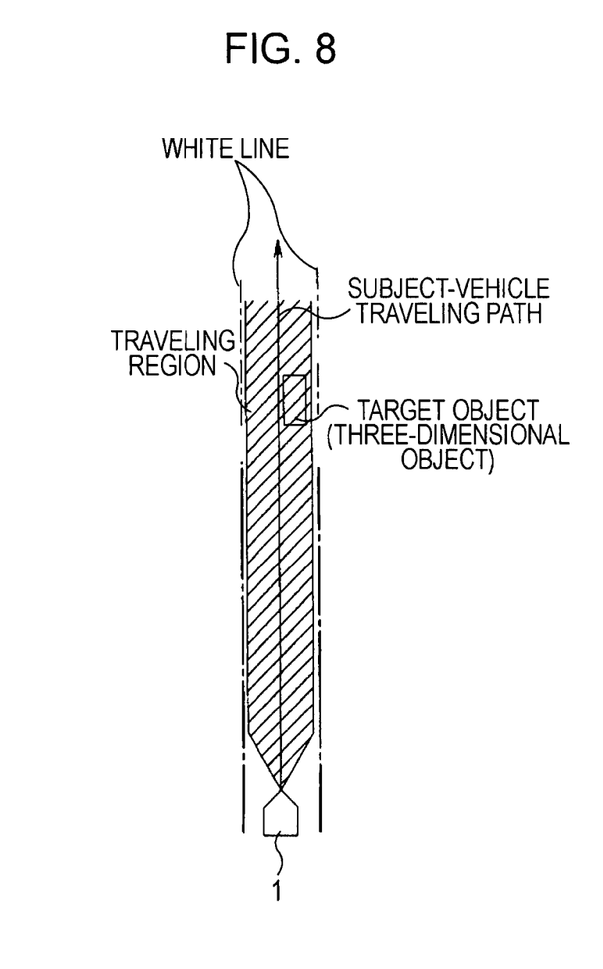
FIG. 8 explains a state in which a target object is present at a position where white lines cannot be recognized.

In contrast, when it cannot be determined whether or not the target object is present on the subject-vehicle traveling lane, the routine proceeds to Step S21. For example, as shown in FIG. 8, when the target object is present at a long distance from the subject vehicle 1, white lines or guardrails cannot be recognized from the information from the stereo-image processing unit 3b, and it cannot be determined whether or not the target object is present on the traveling lane, Step S21 is performed.

Figure 9:
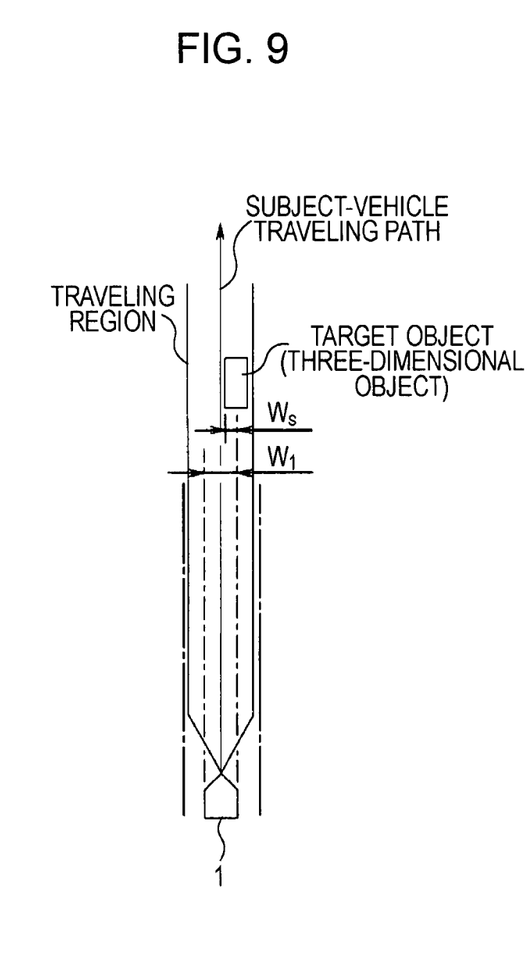
FIG. 9 explains the overlapping ratio of the subject vehicle and the target object.

In Step S21, the overlapping ratio $\epsilon$ (%) between the subject vehicle 1 and the target object is compared with a overlapping-ratio determining threshold value $\epsilon_o$ (%) so as to determine whether or not the target object is a preceding vehicle. As shown in FIG. 9, the overlapping ratio $\epsilon$ refers to the ratio of a width Ws of an overlapping portion between the target object and the subject vehicle 1 to a width W1 of the subject vehicle 1 ($\epsilon$=(Ws/W1)·100). As the overlapping ratio $\epsilon$ approaches 100%, it becomes more difficult for the subject vehicle 1 to pass the target object. Therefore, the possibility that the subject vehicle 1 can pass the target object is found by experiment or by other means beforehand, and the overlapping-ratio determining threshold value $\epsilon_o$ is set on the basis of the possibility.

When $\epsilon \geq \epsilon_o$, in Step S23, the target object is regarded as a preceding vehicle, normal follow-up running control is performed, and the routine is exited. Therefore, when it is determined that $\epsilon \geq \epsilon o$ and Step S23 is performed, the estimated collision time TTC of the subject vehicle 1 with respect to the target object is compared with the three threshold values T1 to T3. When the estimated collision time TTC becomes shorter than or equal to the threshold values T1 to T3, deceleration is forcibly performed by automatic brake control (see FIG. 7).

As described above, in this embodiment, even in a case in which the target object is not recognized as a preceding vehicle and it is impossible to determine whether or not the target object is traveling on the subject-vehicle traveling lane, when $\epsilon \geq \epsilon o$, normal follow-up running control is performed. As a result, the subject vehicle 1 travels at the set vehicle speed so as not to come close to the target object having a high overlapping ratio $\epsilon$, and running control that meets the driver's intention can be achieved.

When it is determined in Step S21 that $\epsilon < \epsilon o$, there is a high possibility that the driver can cause the subject vehicle 1 to pass the target object, by turning the steering wheel. Therefore, throttle follow-up running control is performed in Step S24, and the routine is exited.

In follow-up running control performed in Step S23, when the speed of the target object is less than or equal to the set vehicle speed, control is carried out in a state in which the relative distance between the subject vehicle 1 and the target object is reduced to the target relative distance. In this case, when the target object is decelerated, for example, by braking and the estimated collision time TTC thereby becomes shorter than or equal to any of the threshold values T1 to T3 (see FIG. 7), automatic brake control is performed, and hydraulic brake pressure is supplied from the brake booster 9 to the brake wheel cylinders 9$a$ attached to the four wheels. As a result, the wheels are forcibly secured for deceleration or stopped by braking in accordance with the comparison between the estimated collision time TTC and the threshold values T1 to T3.

In throttle follow-up running control performed in Step S24, automatic brake control is not performed, but control is performed so that the subject vehicle 1 follows the target object while slowly accelerating at a speed lower than the acceleration speed in normal follow-up running control, as described above.

Therefore, for example, when it is determined in Step S19 that the target object is approaching in the oncoming direction and throttle follow-up running control is performed, the vehicle speed is decreased by engine brake as the target object approaches. However, since automatic brake control is not performed, the subject vehicle 1 can pass the target object. In this case, since the overlapping ratio $\epsilon$ is 0% at the position where the subject vehicle 1 can pass the target object, TTC is always more than or equal to $T_o$ in Step S18, and normal follow-up running control is not performed. Further, when the target object accelerates while the subject vehicle 1 is following the target object, the subject vehicle 1 also accelerates. However, since the acceleration speed of the subject vehicle 1 is lower than the acceleration speed in normal follow-up running control, the subject vehicle 1 does not excessively follow the target object, and safe running control can be achieved.

As described above, in this embodiment, even in a case in which it is impossible to clearly specify the target object as a preceding vehicle, when the fixed condition is satisfied, the target object is regarded as the preceding vehicle, and normal follow-up running control is performed. This allows a good running state that meets the driver's intension.

When a vehicle stopped outside the road or an oncoming vehicle is specified as a target object, the subject vehicle can pass the target object by being decelerated only by engine brake without automatic brake control under throttle follow-up running control. This also realizes running control that meets the driver's intention.

What is claimed is:

1. A vehicle running control system comprising:
   front-environment recognition means for recognizing a running environment in front of a subject vehicle;
   target-object extracting means for extracting target objects in front of the subject vehicle on the basis of the running environment recognized by the front-environment recognition means;
   target-object registration means for registering a target object closest to the subject vehicle, of the target objects extracted by the target-object extracting means;
   follow-up running control means configured for performing both throttle control and brake control so that the subject vehicle follows the registered target object, with implementation of either the throttle control or brake control being circumstance determined; and
   running control determining means for determining whether or not to cause the follow-up running control means to perform control so that the subject vehicle follows the registered target object,
   wherein the running control determining means compares an estimated time taken until the subject vehicle collides with the registered target object with a set threshold value, and causes the follow-up running control means to initiate follow-up running control so that the subject vehicle follows the target object when the estimated time is shorter than the threshold value.

2. The vehicle running control system according to claim 1, wherein the threshold value is set on the basis of an overlapping ratio serving as a ratio of a width of an overlapping portion between the target object and the subject vehicle to a width of the subject vehicle, and the threshold value increases as the overlapping ratio increases.

3. The vehicle running control system according to claim 1, wherein the running control determining means determines whether or not the target object is present on a subject-vehicle traveling lane recognized by the front-environment recognition means when the estimated time is longer than or equal to the threshold value, and causes the follow-up running control means to perform control so that the subject vehicle follows the target object when the target object is present on the subject-vehicle traveling lane.

4. The vehicle running control system according to claim 3, wherein, when it is not determined whether or not the target object is present on the subject-vehicle traveling lane, the running control determining means compares an overlapping ratio serving as a ratio of a width of an overlapping portion between the target object and the subject vehicle to a width of the subject vehicle with an overlapping-ratio determining threshold value, and causes the follow-up running control means to perform control so that the subject vehicle follows the target object when the overlapping ratio is more than or equal to the overlapping-ratio determining threshold value.

5. The vehicle running control system according to claim 1, further comprising:

throttle follow-up running control means for performing throttle control only by which the subject vehicle follows the registered target object, wherein the running control determining means controls running of the subject vehicle by the throttle follow-up running control means so that the subject vehicle follows the target object, when it is determined that the target object is approaching in an oncoming direction.

6. The vehicle running control system according to claim 1, further comprising:

throttle follow-up running control means for performing throttle control such that the subject vehicle follows the registered target object only with throttle control and without brake control.

7. The vehicle running control system according to claim 6 wherein said running control means determines whether a currently registered target object corresponds with a previously registered preceding vehicle and, if so, utilizes said follow-up running control means and, if not, carries out an additional step to determine whether to implement said follow-up running control means or said throttle follow-up running control means.

8. The vehicle running control system according to claim 7 wherein said running control means carries out said additional step which is a determination as to whether the target object is determined to be deviating from a traveling region and, if so, said throttle follow-up running control is utilized instead of said follow-up running control.

9. The vehicle running control system according to claim 7 wherein said running control means carries out said additional step which is a determination as to whether the target object is determined to be outside a detected road region and, if so, said throttle follow-up running control is utilized instead of said follow-up running control.

10. The vehicle running control system according to claim 7 wherein said running control means carries out said additional step which is inclusive of a determination as to whether the target object is deemed to be within a predetermined subject-vehicle traveling lane, and, if not, a degree of width overlap between the subject vehicle and the target object, with the likelihood of implementation of the throttle follow-up running control instead of said follow-up running control decreasing with an increase in the degree of the width overlap.

11. The vehicle running control system according to claim 6, wherein said brake control is an automated brake control with varied brake level settings based on estimated collision time relative to the target object and the subject vehicle.

12. The vehicle running control system according to claim 1 wherein the running control determining means, in conjunction with causing the follow-up running control means to initiate follow-up running control relative to a most recent registered target object, discontinues from follow-up running control with a previously registered preceding vehicle.

13. The vehicle running control system according to claim 1 wherein the running control determining means, in conjunction with causing the follow-up running control means to initiate follow-up running control, implements follow-up running control on a target object that does not represent a preceding vehicle travelling in front of the subject vehicle.

* * * * *